United States Patent [19]

Ikeda

[11] Patent Number: 4,572,119

[45] Date of Patent: Feb. 25, 1986

[54] IGNITION TIMING SENSOR FOR DIESEL ENGINE

[75] Inventor: Shinji Ikeda, Susono, Japan

[73] Assignee: Toyota Jidosha Kabushiki Kaisha, Aichi, Japan

[21] Appl. No.: 597,606

[22] Filed: Apr. 6, 1984

[30] Foreign Application Priority Data

Apr. 28, 1983 [JP] Japan .................................. 58-63976
Aug. 12, 1983 [JP] Japan .................................. 58-124434

[51] Int. Cl.[4] ........................ F02P 5/04; F02M 31/00; G01L 23/22

[52] U.S. Cl. ................................ 123/145 A; 123/289

[58] Field of Search .................... 123/145 A, 478, 425, 123/480, 289; 73/35

[56] References Cited

U.S. PATENT DOCUMENTS

| | | | |
|---|---|---|---|
| 4,025,788 | 1/1984 | Franke et al. | 73/35 |
| 4,369,748 | 1/1983 | Steinke et al. | 123/425 |
| 4,377,086 | 3/1983 | Linder et al. | 73/35 |
| 4,412,446 | 11/1983 | Linder et al. | 73/35 |
| 4,413,509 | 11/1983 | Moser et al. | 73/35 |
| 4,419,212 | 12/1983 | Dietz et al. | 73/35 |
| 4,422,321 | 12/1983 | Müller et al. | 73/35 |
| 4,422,323 | 12/1983 | Linder et al. | 73/35 |
| 4,437,334 | 3/1984 | Laurenz | 73/35 |
| 4,446,723 | 5/1984 | Böning et al. | 73/35 |
| 4,452,072 | 6/1984 | Damson et al. | 73/35 |

*Primary Examiner*—Raymond A. Nelli
*Attorney, Agent, or Firm*—Finnegan, Henderson, Farabow, Garrett & Dunner

[57] ABSTRACT

An ignition timing sensor comprises an optical conductor which transmits a combustion light generated at the combustion of fuel in a Diesel engine. The optical conductor has a conically-shaped input end adjacent the inside of a combustion chamber of the Diesel engine. Thus, the input end has a wide field of view and few deposits of carbon. Further, the sensor is located at the down stream side of a glow plug with respect to a fuel injection flow, so that few solid components of the injection fuel abut directly against the input end and few soot reaches same, resulting in that few deposits are attached to the input end.

2 Claims, 4 Drawing Figures

IGNITION TIMING SENSOR FOR DIESEL ENGINE

BACKGROUND OF THE INVENTION

1. Field of the Invention:

The present invention relates to an ignition timing sensor for a Diesel engine.

2. Description of the Prior Art:

A system has been proposed which detects an ignition timing of a Diesel engine by detecting a combustion light of the Diesel engine to feedback controllably a fuel injection time and an injection amount and provide a proper ignition timing for maximizing the performance of the engine. In this system, it is very important to accurately detect the ignition timing as a feedback control factor. For example it is considered that an optical conductor or an optical glass as an optical conductor is provided near the axial center of a glow plug for preheating combustion air to extend through said plug so that the ignition timing of the engine is to be detected from the combustion light in a combustion chamber of the Diesel engine. Such a constitution of the ignition timing sensor does not need to reserve an exclusive mounting position for the sensor in the combustion chamber and thereby simplifies the construction of the combustion chamber. On the other hand, it is expected that the ignition is not to be accurately detected as by viewing a large chamber through a small window when the combustion light in the combustion chamber has to be detected through the glow plug having small diameter relative to the size of the combustion chamber and the optical fiber having still smaller diameter and embedded in said plug.

Further it is suggested that the input end of the sensor is positioned where it is washed by an injection fuel from an injection nozzle in order to remove deposits at the input end. In such a position of the end, however, it is found that when a bad quality fuel, for example the fuel containing a large amount of sulfur, is used or an exhaust gas is recirculated, disadvantages in the center end stained by the deposits of solid components of fuel or the exhaust gas is more than advantages in the washing effect of the sensor by a fuel jet.

SUMMARY OF THE INVENTION

In consideration of these problems, an object of the present invention is to detect accurately the ignition timing with an ignition timing sensor integral with a glow plug by enabling a large chamber to be viewed through a small window.

Another object of the present invention is to provide an input end of the ignition timing sensor having little deposits of solid components of an injection fuel and of soot caused by an incomplete combustion of the injection fuel.

Accordingly the present invention is characterized in that an optical conductor provided to extend through the neighborhood of the axial center of a glow plug has its end located in a combustion chamber and shaped into the conical form.

According to the present invention, the combustion light is to be positively detected and the ignition timing is to be accurately detected since the end of the optical conductor is shaped conically to receive a wide range of the combustion light. Also, since the conical end of the optical conductor has the smooth surface while flames in the combustion abut against the projecting end for self-cleaning action, an effect is obtained that carbon in the combustion does not deposit on the neighborhood of the end of the optical conductor.

Also, the present invention is characterized in that a glow plug is provided in front as viewed in the direction of the fuel jet injected from a nozzle and the ignition timing sensor is provided in the rear.

Thus, since the fuel near the ignition timing sensor becomes lean and the soot is burnt before it swirls and reaches said sensor even if it is produced by the incomplete combustion of the fuel injected from a nozzle, solid components of the fuel are little deposited on the end of the sensor. Therefore, the detecting ability of the sensor is little degraded by stains due to these deposits. Further, since the sensor is located at the most upstream side of a strong air flow introduced from the nozzle, the end of the sensor is powerfully washed by this air flow. Then, a large advantage is to be expected in a washing effect more excellent than that of the conventional constitution previously described.

The present invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
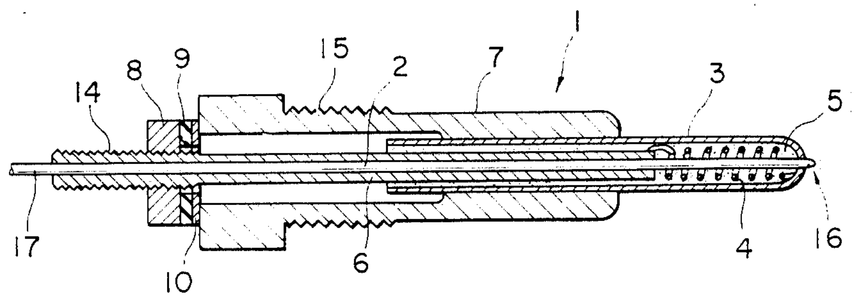
FIG. 1 is a longitudinal cross-sectional view of a glow plug with an ignition timing in accordance with the present invention.

In FIG. 1, a glow plug 1 is well known and a housing 7 is mounted on a cylinder head of an engine by a screw portion 15. Inside the housing 7 are disposed a center electrode 6 and a tube 3 made of heat resisting metal pipe material, and an exothermic coil 4 is electrically connected between the center electrode 6 and the tube 3. The exothermic coil 4 is insulatingly supported by powder 5 of the particulate insulating material filled in the tube 3 and is connected via the center electrode 6 to the non-earthing side of a power source with the action of a nut 8 screwed onto a threaded portion 14 of the center electrode 6. The exothermic coil 4 will be supplied with current when a threaded portion 15 of the housing 7 is mounted on the cylinder head of an engine since the cylinder head is connected to the earth side of the power source. Further, an insulating seal member is designated by 9 and a washer by 10.

Figure 2:
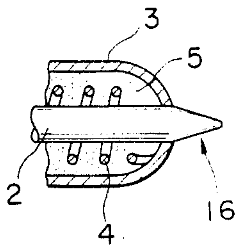
FIG. 2 is the enlarged detailed view of an input end of the sensor shown in FIG. 1.

For example, an optical fiber 2 made of quartz as an optical conductor is disposed to extend through the axial center of the center electrode 6 and the winding center of the exothermic coil 4. An end 16 of the optical fiber is adapted to extend through an end of the tube 3 adjacent a combustion chamber of an engine for collecting the combustion light. Also, a light conducting portion 17 of the optical fiber 2 is connected to a photoelectric converting circuit to convert the light collected at the end 16 to electric signals. As is apparent from the enlarged sectional view of FIG. 2, the end 16 of the optical fiber 2 is shaped conically to widen the light collecting angle while preventing this portion from carbon deposits.

By such a constitution is to be detected the combustion light at a wide angle by the ignition timing sensor according to the present invention to detect positively the ignition timing of an engine.

Also, the light conducting portion 17 of the optical fiber 2 may be disposed to cross the housing 7 from the side of the center electrode 6, and a separate sealing means may be provided in the connection of the tube 3 and the optical fiber 2 to ensure the sealing property between the tube 3 and the optical fiber.

Figure 3:
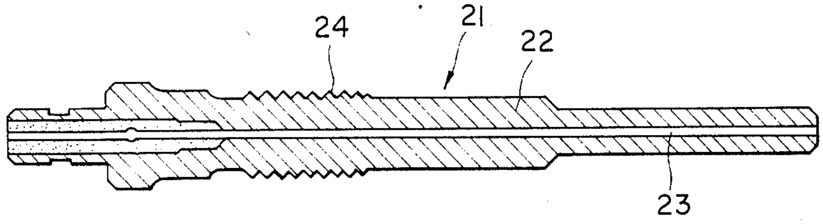
FIG. 3 is a longitudinal cross-sectional view of another preferred embodiment according to the present invention.

FIG. 3 shows an ignition timing sensor 21 in which a fiber 23 made of quartz glass extends through a center hole of a main body 22 formed by the carbon steel or stainless steel. A male screw 24 is threaded on the main body 22 to be fixedly threaded into the cylinder head.

Figure 4:
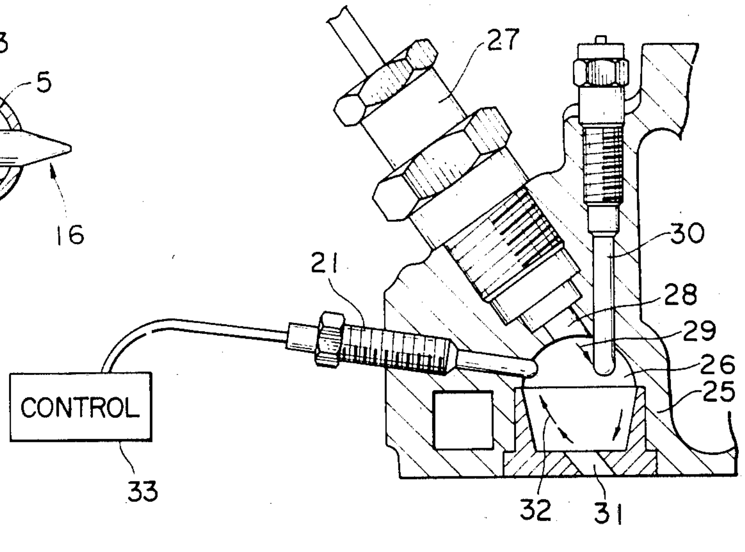
FIG. 4 is a schematic view showing a position of the sensor in FIG. 3 where it is attached to a Diesel engine.

FIG. 4 shows a cylinder head 25 of a swirl chamber type Diesel engine which is formed with a swirl chamber 26. A fuel injection nozzle 27 has its jet 28 opened tangentially to the swirl chamber 26. A glow plug 30 is provided in front as viewed in the direction of a fuel jet 29 injected from this jet 28, and the injection timing sensor 21 provided in the rear of the jet 28 as viewed in that direction. This swirl chamber 26 and a main combustion chamber in a cylinder block not shown communicate to each other through a jet 31 directed similarly tangentially.

Now, compressed air is introduced into the swirl chamber 26 through the jet 31 in the compression stroke of the engine and swirls in the swirl chamber 26 as shown by the arrow 22 to produce a strong swirl. Fuel injected from the nozzle 27 encounters the powerfully swirling air to be rapidly mixed therewith, fired and burned by a glow plug 30 and exhausted from the jet 31 to the main combustion chamber. This ignition timing is detected by the sensor 1 to be transmitted to a control 33.

Since the ignition timing sensor 21 is thus located in the rear of the fuel jet 29 injected from the nozzle 27, even if the fuel is lean and the soot is produced by the incomplete combustion of fuel injected from the nozzle 27, the soot is burnt before it swirls and reaches the sensor 21. Therefore, solid components of the fuel are little deposited on the end of the sensor and thus the detecting ability of the sensor is little degraded by the deposit. Further since the sensor 21 is located at the most downstream side of a powerful air flow 32 introduced from the jet 31, the end of the sensor is powerfully washed by this air flow 32. Then, a large advantage is to be expected in a washing effect better than that of the conventional constitution described at first.

What is claimed is:

1. An ignition timing sensor system for use in a diesel engine swirl chamber, comprising:

a connecting jet connecting said swirl chamber to a main combustion chamber;

a fuel injection nozzle having a fuel jet opening into said swirl chamber substantially tangentially to a wall of said swirl chamber;

a glow plug mounted in said swirl chamber and including a heater positioned downstream from said fuel jet with respect to the direction of fuel flow injected from said fuel jet; and an ignition sensor mounted in said swirl chamber, said sensor including a first end extending into said swirl chamber and an optical conductor projecting through said first end into said swirl chamber, said first end being displaced from said direction of fuel flow and positioned downstream from said connecting jet with respect to the direction of air flow from said main combustion chamber, said air flow abutting against and washing said optical conductor.

2. The ignition timing sensor system defined in claim 1, wherein said ignition sensor is positioned upstream from said glow plug with respect to the direction of fuel flow injected from said fuel jet.

* * * * *